June 30, 1964   C. SWICK   3,139,290
BUMPER MEANS FOR SCRAPER-LOADERS AND THE LIKE
Filed Sept. 18, 1961   2 Sheets-Sheet 1

INVENTOR.
CLARENCE SWICK
BY
John H. Widdowson
ATTORNEY

June 30, 1964  C. SWICK  3,139,290
BUMPER MEANS FOR SCRAPER-LOADERS AND THE LIKE
Filed Sept. 18, 1961  2 Sheets-Sheet 2
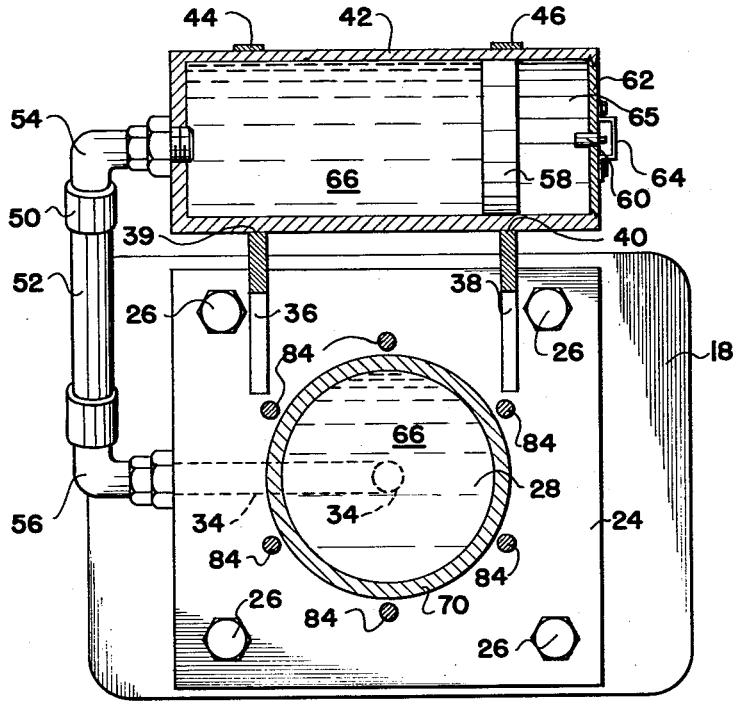
FIG. 4
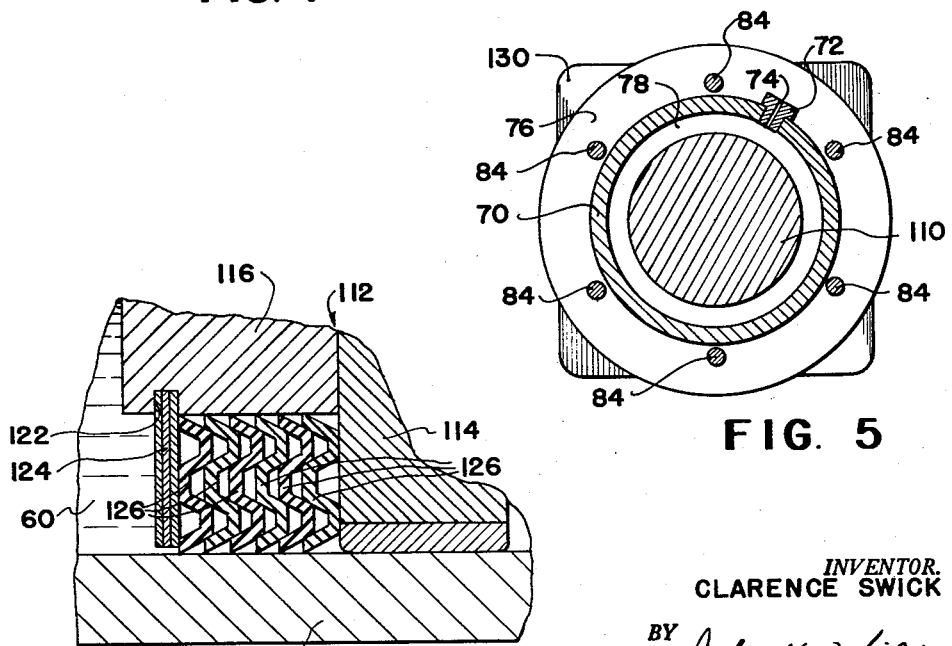
FIG. 5
FIG. 6
*INVENTOR.*
CLARENCE SWICK
BY John H. Widdopson
ATTORNEY United States Patent Office 3,139,290
Patented June 30, 1964

3,139,290
BUMPER MEANS FOR SCRAPER-LOADERS
AND THE LIKE
Clarence Swick, 400 N. Chestnut, McPherson, Kans.
Filed Sept. 18, 1961, Ser. No. 138,697
3 Claims. (Cl. 280—481)

This invention relates to bumper means and more particularly to means for absorbing the shock received by a moving or stationary object. In a more specific aspect, the invention relates to shock absorbing bumper means particularly constructed and adapted for mounting on a scraper-loader or the like or on pusher means for a scraper-loader or the like which includes means constructed and mounted relative to the devices to absorb the shock of a load transmitted from one member to the other during operation.

Various types of scraper-loaders and pusher means therefor are known to the art as are shock absorbing cylinders. However, the usual and common vehicle, such as a scraper-loader for moving large amounts of earth and the like as well as bull dozers, etc. are not normally provided with any shock absorbing means for tandem operation of the vehicles. As the size of scraper-loader equipment and similar equipment becomes larger and their load carrying capacity increases proportionately the need for an assisting vehicle to aid in pushing or pulling the load has substantially increased. In the usual prior art device, a rigid projecting member is secured to one of the vehicles and a similar rigid projecting member, blade or the like is provided with the other of the vehicles with same being in contact during pushing operation. The vehicles must either be stationary when initial contact is made or the operators and equipment are subjected to sharp and often damaging blows when the equipment is contacted while one or both are moving. This is particularly true when one portion or part of the equipment is stationary during the initial shock. No satisfactory means has been provided with the prior art devices whereby this shock can be absorbed, permitting engagement of the pushing and pulling vehicles while both are moving or while only one is moving.

In accordance with the present invention, the difficulties and deficiencies of the prior art devices have been overcome. Shock absorbing means have been provided which includes means to secure same to a vehicle and fluid reservoir means are provided therewith to receive a fluid. Bumper means are movably mounted relative to the reservoir and are operable to displace a fluid in the fluid reservoir means so that when a force or shock load is received on the bumper means same will be cushioned by the fluid.

Accordingly, it is an object of the invention to provide new shock absorbing means.

Another object of the invention is to provide new shock absorbing means particularly constructed and adapted for mounting on earth moving equipment such as scraper-loaders, bull dozers and the like.

A further object of the invention is to provide new shock absorbing means for vehicles operated in tandem.

Another object of the invention is to provide new shock absorbing means particularly constructed for scraper-loaders and the like whereby the load received by a bumper member is transmitted through a fluid to a piston to cause compression of a gas.

A further object of the invention is to provide new bumper means which receives a load and transmits same through a piston member operatively attached thereto to cause compression of a gas.

Various other objects, advantages and features of the invention will become apparent to those skilled in the art from the following description taken in conjunction with the accompanying drawings, in which:

FIG. 4 is a cross section view taken along the line 4—4 of FIG. 2.

FIG. 5 is a cross section view taken along the line 5—5 of FIG. 2.

FIG. 6 is an enlarged partial cross section view showing a preferred construction of sealing means used with the piston in applicant's preferred specific embodiment.

Figure 1:
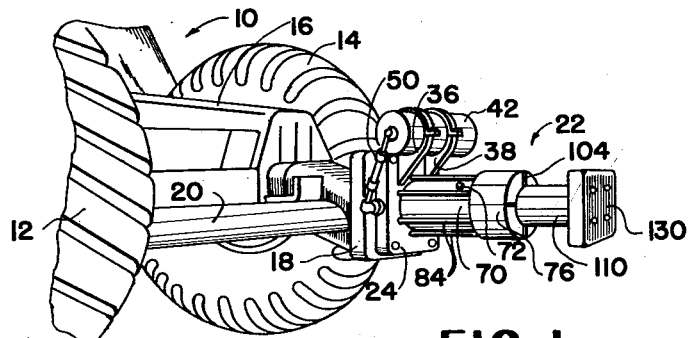
FIG. 1 is an isometric view of an end portion of a scraper-loader or similar equipment having mounted thereon a preferred embodiment of the shock absorbing bumper apparatus of the invention.

The following is a discussion and description of a preferred specific embodiment of the new bumper for scraper-loaders and the like of the invention, such being made with reference to the drawings whereon the same reference numerals are used to indicate the same or similar parts and/or structure. It is to be understood that such discussion and description is not to unduly limit the scope of the invention.

Referring now to the drawings in detail, FIG. 1 illustrates a scraper-loader or other earth moving equipment as shown generally at 10 which is mounted on wheels 12 and 14 which support therebetween the body 16 of the vehicle. A stationary plate 18 of common construction is normally provided and is supported by suitable frame members 20.

The shock absorbing apparatus of the invention is shown generally at 22 and in the preferred specific embodiment illustrated in the drawings includes a mounting and head end plate 24 which is preferably constructed to be removably mounted on the plate 18 in any suitable manner, such as by the use of the mounting bolts 26.

Preferably, the plate 24 is provided with a centrally located cylindrical abutment or the like 28 which projects from one face of the plate. The abutment 28 of plate 24 has an annular groove 30 in the axially outer end portion of the radially outer surface and an annular resilient sealing ring or the like 32 is received by the groove 30 and is dimensioned relative to the groove to project slightly therefrom.

Figure 2:
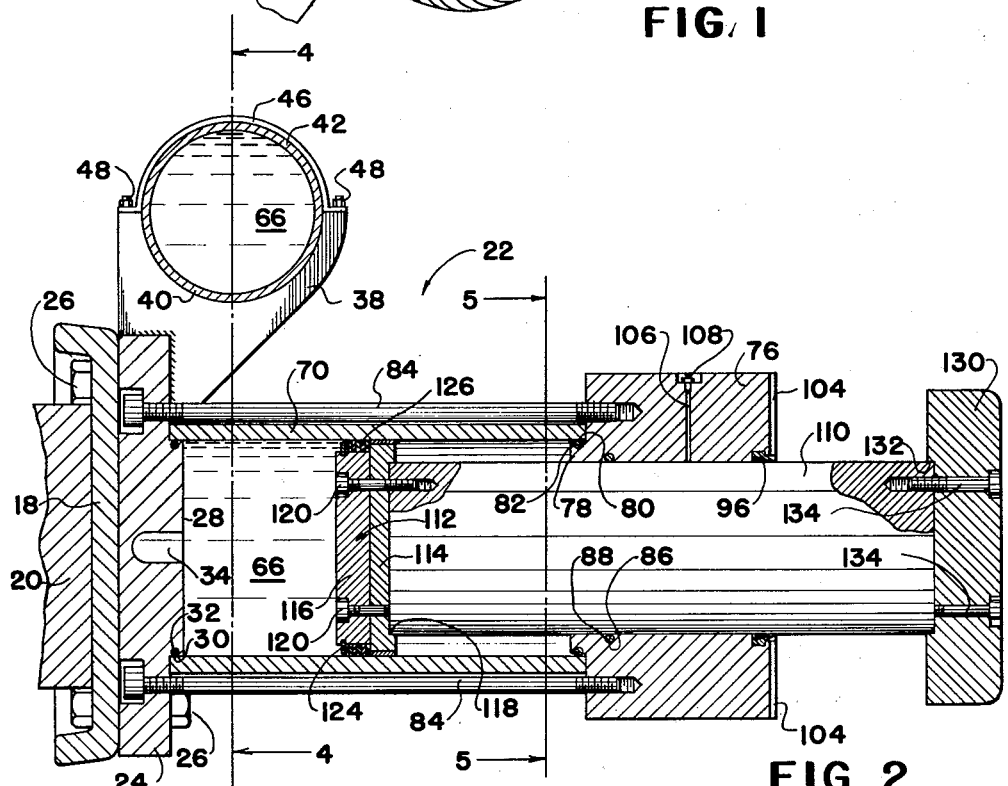
FIG. 2 is an enlarged cross section view of the bumper means shown in FIG. 1.

The plate 24 preferably has a bore or opening 34 therethrough which extends from one side of the plate 24 to the center portion thereof and then terminates at the center portion of the abutment 28 as is best illustrated in FIGS. 2 and 4.

Two like mounting brackets 36 and 38 are preferably provided and are rigidly secured to the plate 24 in any suitable manner, such as by welding or the like. The brackets 36 and 38 preferably extend upwardly from the plate 24 and the back side or portion thereof is preferably substantially coplanar with the back surface of the plate 24 so as not to interfere with the mounting of plate 24 on bumper or plate 18. The upwardly projecting portion of each of the brackets is preferably provided with a semi-circular notch or the like as shown at 39 and 40 in FIGS. 3 and 4. The notches are preferably axially aligned and an elongated hydraulic cylinder 42 is received by the notches in the brackets as illustrated in the drawings. The cylinder 42 can be suitably mounted in the brackets 36 and 38 in any suitable manner, such as by the use of two arcuate metallic straps 44 and 46 which surround the cylinder 42 and are secured in their ends to the brackets 36 and 38 in any suitable manner, such as by the use of the bolts or the like 48, FIG. 2.

Conduit means 50 is secured in one end portion to one end of the cylinder 42 and is secured in the other end portion to the bore 34 in plate 24. Preferably, the conduit means 50 includes a flexible central portion 52 having rigid couplings 54 and 56 at the ends thereof which are secured to the cylinder 42 and to the bore 34, respectively. The conduit means 50 provides fluid communication between the interior of cylinder 42 and the bore 34.

A free floating piston 58 is positioned in the cylinder 42 and a valve member 60 is mounted in an end plate 62 of the cylinder 42 and is covered by a closure plate or cover member 64. The cover member 64 will prevent damage to the valve member 60 in operation and the valve member 60 is constructed to pass an inert gas 65 through the end 62 into the cylinder 42 between end plate 62 and the piston 58 therein. The remainder of the cylinder 42 is filled with a hydraulic fluid as shown at 66 with the piston 58 being movable in response to the varying pressures between the gas 65 and the hydraulic fluid 66.

An elongated cylinder or tubular member 70 is provided and receives in the head end portion the projecting abutment 28 on the plate 24 with the inner surface of the member 70 being dimensioned relative to the abutment 28 so as to snugly receive and engage the sealing ring 32 in the groove 30 and with the axial end portion of the member 70 engaging the surrounding surface of the plate 24.

A plug or the like 72 having a bore or opening 74 therethrough as illustrated in FIG. 5 of the drawings is preferably provided and is positioned in the other end or rod end portion of the tubular member 70 with the bore 74 providing fluid communication between the atmosphere and the interior of the rod end portion of the tubular member.

A generally tubular collar 76 is provided and has an annular projecting abutment 78 on one end face thereof. The abutment 78 has an annular groove 80 in the radially outer surface of the axially outer end portion thereof and an annular resilient sealing ring 82 is positioned in the groove 80 and projects slightly therefrom in the uncompressed state. The annular abutment 78 of the collar 76 is received by the rod end portion of the tubular member 70 with the inner surface of the member 70 sealingly engaging the ring 82 and with the axially outer end portion of the member 70 engaging the surface of the collar 76.

Suitable mounting means are provided to connect or secure the plate 24, tubular member 70 and collar 76 in assembled relation. In the preferred embodiment illustrated in the drawings such mounting means include a plurality of mounting bolts 84 which are positioned around the tubular member 70 and which desirably have the head end portion thereof recessed in the opposite face of the plate 24 with the threaded end portion thereof being threadedly mounted in the collar 76 as is best illustrated in FIG. 2 of the drawings. Preferably, six of the bolts 84 are provided and such are desirably circumferentially equally spaced apart as is illustrated in FIGS. 4 and 5 of the drawings.

Figure 3:
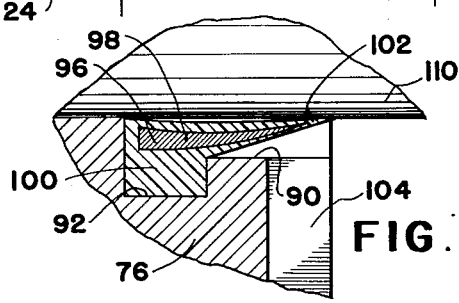
FIG. 3 is an enlarged partial cross section view showing the preferred construction and mounting of one of the sealing means of the bumper member.

An annular groove 86 is preferably provided in the inner surface of the collar 76 near the end face thereof having the projecting abutment 78 thereon and a resilient sealing ring or member 88 is received in the groove in the usual and common manner. Another groove 90 is provided in the inner surface of the collar at the other end portion thereof and the groove 90 is preferably axially elongated and provided with a radially enlarged inner portion 92 as is best illustrated in FIG. 3 of the drawings. A sealing member 96 is received by the groove 90 and preferably is constructed to substantially fill the groove 90 and enlargement 92 thereof. The seal 96 is preferably constructed of a metallic body portion 98 which extends substantially the axial length of the groove 90 and is covered by a resilient plastic portion 100 which extends into and substantially fills the enlarged portion 92 of the groove 90. The metal body portion 98 and plastic covering 100 thereon preferably project outwardly relative to the groove 90 to form a lip portion 102 which projects radially inwardly and is engageable with a member received by the collar 76 as described hereinafter.

The outer end face of the collar 76 is preferably provided with a plurality of radially extending grooves formed in the outer surface as shown in 104 and the grooves 104 provide air vents and prevent air from being compressed against the end face of collar 76 in operation. Preferably, a radially extending bore 106 is provided in the collar 76 to pass lubricating material therethrough to the inner surface or bore of the collar and the bore 106 is preferably covered with a removable cap 108.

A piston rod 110 is provided and is received by the collar 76 and is slidable therein. Piston rod 110 preferably has a hardened outer surface, such as a chrome plated surface. Rod 110 is engaged by seals 88 and 96 in collar 76.

A cylindrical piston as shown generally at 112 is provided and preferably includes two plates 114 and 116, the plate 114 preferably being brass plated on the outer surface or otherwise constructed of a relatively low friction material and slidably engages the inner wall of the tubular member 70. Plate 114 preferably has a centrally located circular recess 118 which is dimensioned to receive the piston rod 110 as illustrated in FIG. 2. Plate 116 abuts the other face of the plate 114 and is coaxially secured thereto with the plate 116 preferably being relatively smaller in diameter than the plate 114. The plates 114 and 116 are bolted together and to the piston rod 110 by suitable bolts or the like 120.

A groove or recess 122, FIG. 6, is formed in the plate 116 and receives a snap ring 124 of common construction. A plurality of sealing rings 126 are received by the plate 116 and are positioned between plate 114 and snap ring 124 and are desirably compressed when mounted so as to exert an outwardly directed force on the inner surface of the member 70 and thus prevent the flow of liquids around the piston 112. By using a plurality of the sealing members 126 the chances of total failure of the sealing members is substantially reduced.

A bumper member 130 is provided and desirably has a centrally located cylindrical recess 132 formed therein as shown in FIG. 2 which receives the other end portion of the piston rod 110. The bumper 130 is secured to the piston rod in any suitable manner, such as by the use of mounting bolts 134. Preferably, the mounting bolts 134 have the head thereof recessed in the bumper 130 so as to present a smooth face on the bumper. The bumper 130 is shown as being rectangular or square in shape as best illustrated in FIG. 1 of the drawings, however, other suitable shapes can be used, if desired. Also, while the bumper member 130 is shown as being made of a metal material, suitable metals and/or resilient materials, including rubber and rubber-like materials can be used, if desired. Also, the bumper member 130 can be shaped to provide a recess facing outwardly from the rear end of the device to receive a projecting member on another vehicle to eliminate any possibility of the desired contact being lost by sliding or moving of one member relative to the other.

In operation, the hydraulic cylinder 42 between piston 58 and the conduit means 50 is filled with hydraulic fluid 66 as is the conduit 50, the bore 34 in plate 24 and the tubular member 70 from the plate 24 to the piston 112. When the bumper member 130 is engaged, the piston rod 110 and piston 112 are retracted into the tubular member 70, causing hydraulic fluid in the tubular member to be forced through the bore 34 of plate 24 and through conduit means 50 into the cylinder 42, thus causing compression of the gas 65 to absorb the shock of the load on the bumper 130. When the force on bumper 130 is released, the gas 65 will expand moving piston 58 and forcing hydraulic fluid 66 through conduit means 50 and bore 34 into the tubular member 70 to return bumper 130 to the extended position. Air between the piston 110 and collar 76 and between the piston rod 110 and the tubular member 70 will be evacuated through the bore 74 in plug 72 which prevents the build up of air pressure in this portion of the apparatus which would tend to impede outward movement of the piston 112. In operation the sealing members contain the hydraulic fluids 66 within the various elements as described with the seal 96 also preventing the entrance of foreign matter into the device. Should bumper 130 be moved into its furthermost inwardly position and engage collar 76, then the grooves 104 permit the escape of air which might otherwise tend to be trapped between surfaces on contact.

The fluid utilized to operate the shock absorbing apparatus can be stored on displacement in any suitable manner or means, many of which are known in the prior art, such as in the cylinder or tubular member 70 or in a suitable container remote from the cylinder or tubular member and suitably located at any place on the apparatus or on the equipment having the shock absorbing apparatus thereon.

By mounting the hydraulic cylinder 42 above the mounting plate 24, the length of the apparatus as it projects from the rear of a scraper-loader or the like as shown at 10 in FIG. 1 can be maintained relatively short without sacrificing the length of the stroke obtained or shock absorbing function. However, if desired, tubular member 70 can be constructed so as to receive a free floating piston such as shown at 58 and the gas can be contained within the tubular member and compressed therein by operation of the bumper member.

The shock absorbing apparatus of the invention has been described as being mounted on a scraper-loader or the like as shown at 10, however, it will be apparent to those skilled in the art that the apparatus can be used with a wide variety of vehicles without departing from the spirit of the disclosure or the scope of the claims. Also, it will be apparent that such bumper structure can be used on either the pushing or the pushed vehicle when tandem operation is being used.

While the invention has been described in connection with a preferred specific embodiment thereof, it will be understood by those skilled in the art that various modications or changes in this construction can be made or followed in the light of this discussion and description without departing from the spirit of the disclosure or the scope of the claims.

I claim:

1. A shock absorbing apparatus for a scraper-loader or the like comprising, in combination, a mounting and head end plate, said plate having four holes therethrough to receive bolts or the like to mount said plate on a scraper-loader or the like, a centrally located cylindrical abutment projecting from one face of said plate, said abutment having an annular groove in the axially outer end portion of the radially outer surface thereof, an annular resilient sealing ring received by said groove, said plate having a bore extending from one side thereof to the center portion of said plate and terminating at the center of said abutment, two like mounting brackets rigidly secured to said plate and having a portion projecting from the top side thereof, said projecting portion of each of said brackets having a semi-cylindrical notch in the top thereof with said notches being axially aligned, an elongated hydraulic cylinder received by said notches in said brackets, two arcuate metallic straps surrounding the top portion of said hydraulic cylinder, each of said brackets having the ends of one of said straps secured thereto to mount said hydraulic cylinder, a conduit secured in one end portion to one end of said hydraulic cylinder and secured in the other end portion to said plate at said one side thereof and in fluid communication with the interior of said hydraulic cylinder and said bore in said plate, a free floating piston positioned within and movable in said hydraulic cylinder, a valve mounted in the other end of said hydraulic cylinder, a cover removably mounted on said other end of said cylinder and positioned to enclose said valve, said cylinder being constructed to receive hydraulic fluid therein on one side of said piston and in communication with said conduit and an inert gas therein on the other side of said piston with said piston being freely movable in response to pressures exerted thereon by said fluid and said gas, an elongated tubular member having a head end portion and a rod end portion, said tubular member snugly receiving in said head end portion said projecting abutment on said plate with the inner surface of said tubular member in sealing engagement with said resilient sealing ring on said abutment, a plug threadedly mounted in said rod end portion of said tubular member and having a centrally located bore therethrough to provide fluid communication between the atmosphere and the interior of said tubular member, a tubular collar having an annular projecting abutment on one end face thereof, an annular groove in the radially outer surface of the axially outer end portion of said abutment on said collar, an annular resilient sealing ring positioned in said last-named groove, said rod end portion of said tubular member receiving said abutment on said collar and engaging said one end face of said collar with said inner surface of said tubular member snugly and sealingly engaging said sealing ring on said abutment on said collar, six elongated mounting bolts extending through said plate and threadedly mounted in said collar to secure said mounting plate, said tubular member and said collar in assembled relation, said last-named bolts having the heads thereof countersunk in the other face of said plate and equally spaced apart circumferentially and positioned adjacent the outer surface of said tubular member, an annular groove in the inner surface of said collar near said one end face thereof, an annular resilient sealing ring positioned in said last-named groove, another groove in said inner surface of said collar at the other end thereof, said last-named groove having an enlarged inner portion, a seal mounted in said last-named groove with a portion of said seal substantially filling said enlarged portion of said last-named groove and a lip portion projecting outwardly therefrom, said last-named seal having a metallic body covered with a resilient plastic material, the other end face of said collar having a plurality of radially extending grooves therein forming air vents, a radially extending bore through said collar to pass lubricating material therethrough, a removable cap mounted on said last-named bore, a chrome plated piston rod received by said collar, a cylindrical piston positioned within said tubular member and bolted to one end of said piston rod, said last-named piston including a plate with a brass plated outer surface slidably engaged with said inner wall of said tubular member, said last-named plate having a centrally located circular recess in one face thereof receiving said one end of said piston rod, said last-named piston including another plate abutting the other face of said first-named plate and coaxially secured thereto, said last-named plate being smaller in diameter than said first-named plate and having a groove formed in the outer surface thereof, a snap ring removably mounted in said last-named groove and projecting therefrom, a plurality of sealing rings received by said last-named plate and sealingly engaging said inner wall of said tubular member and compressed between said snap ring and said first-named plate, and a rectangular bumper having a centrally located cylindrical recess in one face thereof, said bumper being bolted to the other end of said piston rod with said recess therein receiving said rod, said conduit and said tubular member between said piston therein and said mounting plate being filled with a hydraulic fluid, said apparatus being constructed and adapted so that when said bumper is engaged said piston in said tubular member is retracted, causing said hydraulic fluid in said tubular member to be forced through said bore in said mounting plate and through said conduit into said hydraulic cylinder to compress said gas in said cylinder, to thereby absorb shock.

2. Shock absorbing apparatus for a scraper-loader or the like comprising, in combination, a mounting and head end plate mountable on a scraper-loader or the like, a cylindrical abutment projecting from one face of said plate, sealing means mounted in the radially outer surface of said abutment, a bore through said plate opening in one end at said abutment, a hydraulic cylinder mounted on said plate, conduit means connecting one end of said hydraulic cylinder to said bore in said plate, a piston positioned within said cylinder, an elongated tubular member having a head end portion and a rod end portion, said tubular member engaging said one face of said plate and dimensioned to snugly receive in said head end portion said projecting abutment on said plate with the inner surface of said tubular member in sealing engagement with said sealing means on said abutment, a collar having an annular projecting abutment on one end face thereof, sealing means in the radially outer surface of said last-named abutment, said rod end portion of said tubular member telescopically receiving said abutment on said collar and snugly and sealingly engaging said sealing means on said collar, mounting bolts extending between and connected to said plate and said collar to secure said plate, said collar and said tubular member in assembled relation, sealing means in the inner surface of said collar positioned near the ends thereof, an elongated piston rod received by said collar and projecting into said tubular member, a piston positioned within said tubular member and secured to said piston rod, sealing means positioned on said last-named piston and sealingly engaging said inner surface of said tubular member, and a bumper secured to the other end of said piston rod, a hydraulic fluid positioned in and substantially filling said tubular member between said last-named piston and said mounting plate, said bore in said mounting plate, said conduit and said hydraulic cylinder between said piston therein and said one end portion thereof, and said hydraulic cylinder between said piston therein and the other end thereof being filled with an inert gas so that when said bumper is engaged said piston in said tubular member is retracted causing displacement of said hydraulic fluid from said tubular member through said bore, said conduit and into said hydraulic cylinder to compress said gas in said cylinder and thereby absorb shock.

3. Shock absorbing apparatus for a scraper loader or the like comprising, in combination, a mounting and head end plate mountable on a scraper loader or the like, mounting means projecting from one face of said plate, a bore through said plate opening in one end at said mounting means of said plate, a hydraulic cylinder mounted on said plate, conduit means connecting one end of said hydraulic cylinder to said bore in said plate, piston means positioned within said cylinder, an elongated housing member having a head end portion and a rod end portion, said housing member engaging said one face of said plate and receiving in said head end portion said mounting means on said plate, a collar having an abutment on one end face thereof, said rod end portion of said housing member receiving said abutment on said collar, mounting means connected to said plate and said collar to secure said plate, said collar and said housing member in assembled relation, an elongated piston rod slidably received by said collar and projecting into said housing member, a piston positioned within said housing member and secured to said piston rod, sealing means positioned on said last-named piston and sealingly engaging said inner surface of said housing member, and a bumper secured to the other end of said piston rod, hydraulic fluid positioned in and substantially filling said housing member between said last-named piston and said plate, said bore in said plate, said conduit and said hydraulic cylinder between said piston therein and said one end portion thereof, and said hydraulic cylinder between said piston therein and the other end thereof being filled with a gas so that when said bumper is engaged said last-named piston is retracted in said housing member causing displacement of said hydraulic fluid from said housing member through said bore, said conduit and into said hydraulic cylinder to compress said gas in said cylinder and thereby absorb shock.

References Cited in the file of this patent
UNITED STATES PATENTS

| | | |
|---|---|---|
| 2,873,994 | Omps | Feb. 17, 1959 |
| 2,986,827 | Peterson | June 6, 1961 |
| 3,079,176 | Duke et al. | Feb. 26, 1963 |

FOREIGN PATENTS

| | | |
|---|---|---|
| 457,299 | Great Britain | Nov. 25, 1936 |